United States Patent [19]

Ziemek

[11] Patent Number: 5,263,239
[45] Date of Patent: Nov. 23, 1993

[54] METHOD FOR MANUFACTURING AN OPTICAL WAVEGUIDE CABLE ELEMENT

[75] Inventor: Gerhard Ziemek, Langenhagen, Fed. Rep. of Germany

[73] Assignee: Kabelmetal Electro GmbH, Fed. Rep. of Germany

[21] Appl. No.: 985,843

[22] Filed: Dec. 3, 1992

[30] Foreign Application Priority Data

Dec. 13, 1991 [DE] Fed. Rep. of Germany ....... 4141091

[51] Int. Cl.$^5$ .............. B23P 25/00; B29C 47/00; B29D 11/00; B21D 39/02
[52] U.S. Cl. .................... 29/458; 29/527.2; 264/1.5; 156/244.12; 228/148
[58] Field of Search .......... 29/458, 430, 537.2, 29/828, 514; 264/1.5, 1.6, 174; 156/244.12; 228/148

[56] References Cited

U.S. PATENT DOCUMENTS

| | | | |
|---|---|---|---|
| 4,129,468 | 12/1978 | Knab | 156/244.12 |
| 4,468,435 | 8/1984 | Shimba et al. | 156/244.12 |
| 4,741,470 | 5/1988 | Winter et al. | 228/148 |
| 4,759,487 | 7/1988 | Karlinski | 228/17.5 |
| 4,852,790 | 8/1989 | Karlinski | 228/148 |

Primary Examiner—P. W. Echols
Assistant Examiner—David P. Bryant
Attorney, Agent, or Firm—Ware, Fressola, Van der Sluys & Adolphson

[57] ABSTRACT

A method is disclosed for manufacturing an optical fiber cable element having plurality of optical fibers which are arranged with excess length inside a pressure-tight metal tube. Means are provided inside the metal tube for protecting the optical fibers and for longitudinal sealing. The optical fibers are first embedded in a soft or compressible compound to form a cable element core. The outside, diameter of the cable element core generally corresponds to the inside diameter of the metal tube in the finished cable and the optical fibers being present with excess length in the cable element core. A metal band is subsequently continuously formed into a slotted tube surrounding the cable element core. A distance remains between the cable element core and the tube. The slotted tube is welded together and the tube is drawn down onto the cable element core.

9 Claims, 1 Drawing Sheet

METHOD FOR MANUFACTURING AN OPTICAL WAVEGUIDE CABLE ELEMENT

BACKGROUND OF THE INVENTION

1. Field of the Invention

The invention relates to a method for manufacturing an optical fiber cable element having a plurality of optical fibers which are arranged with excess length inside a pressure-tight metal tube. Means for protecting the optical fibers and for longitudinal sealing are provided inside the metal tube.

2. Description of the Prior Art

Optical fiber cables having a plurality of optical fibers which are arranged in a pressure-tight metal tube are preferably used as submarine cables. The aim is to manufacture great lengths in one piece since the splicing of submarine cables is unreliable and costly. Since it is not possible to insert the optical fibers into prefabricated tubes of great length, the only remaining possibility is the continuous sheathing of optical fibers with longitudinally seam-welded tubes, i.e., the insertion of the optical fibers into a slotted tube which is still open.

Such a method is described in U.S. Pat. No. 4,759,487. A metal band, preferably of stainless steel, drawn off a supply reel, is gradually shaped into the slotted tube in a plurality of shaping steps. The optical fibers are run into the still-open slotted tube and the longitudinal seam of the slotted tube is welded together. Laser welding is used as the welding method. After the welding, the diameter of the metal tube is reduced, the drawing force being produced by a drawing drum. The excess length of the optical fibers is produced by having the optical fibers introduced into the tube by a separate tube which runs inside the welded and drawn tube, the end of which extends up to the area of the drawing drum. A gas is conducted through the tube and "lubricates" the optical fibers as they pass through the tube and ensures that the optical fibers rest against the outer circular arc of the welded tube. A further tube extends into the area of the drawing drum in the interior of the welded tube and is provided for longitudinally sealing the optical fiber cable. This second tube is longer than the tube carrying the optical fibers and transports a jelly-like compound into the welded tube which fills up the free space between the optical fibers and the inside wall of the welded tube.

When the production rate is approximately 20 m/min, more than three days are required to produce a length of 100 km of cable element. The aim is to fabricate the length to be produced without stopping, since each production stop is associated with an increased fault rate.

The known method has a number of disadvantages. For example, the handling of the optical fibers, i.e., the winding-off, the guiding through the tube and the blowing in of air, can lead to a fracture of the glass fiber even though it is coated with a plastic layer. Furthermore, the excess length to be achieved in this method is insufficient for many applications. The excess length depends on the outside diameter and the wall thickness of the welded tube. It is also not possible to check the longitudinal sealing during production. Thus, in this method, faults or defects can only be found in the completed cable, i.e., after more than three days of production.

SUMMARY OF THE INVENTION

An object of the present invention is to provide a method for manufacturing an optical fiber cable element of the type initially mentioned, in which the susceptibility to faults is substantially less. In particular, it should be possible to detect faults from the preproduction by intermediate checking and to replace the faulty product.

This object is achieved by having the optical fibers embedded in a soft compressible compound to create a cable element core. The outside diameter of the cable element core almost corresponds to the inside diameter of the metal tube in the finished cable and the optical fibers being present with excess length in the cable element core. A metal band is continuously formed into a slotted tube surrounding the cable element core whereby a distance remains between the cable element core and the tube. The slotted tube is welded together and the tube is drawn down onto the cable element core.

The cable element core with the embedded optical fibers can be manufactured without difficulty. For example, the cable element core could be a loose tube cable core, i.e., a small tube of a soft plastic in which a plurality of optical fibers with excess length and a jelly-like compound are located. Such cable element cores are not as sensitive as the unprotected optical fibers during the processing in a tube welding apparatus. Shaping the metal band into a slotted tube with a larger diameter than the cable element core prevents the welding heat from damaging the cable element core and thus the optical fibers. As a result of the subsequent drawing-down of the metal tube onto the cable element core, the latter is fixed in the tube and the interior of the tube is at the same time longitudinally sealed. Since the production rate is limited by the welding cycle, the drawing cycle results in an increase in production rate.

According to a particularly advantageous further development of the invention, the optical fibers are embedded in the cable element core in the form of one or more ribbon cables, in such a manner that the ribbon cables are twisted in the same direction or with alternating direction about the longitudinal axis. A ribbon cable is understood to be a structure of a plurality of optical fibers extending in parallel next to one another in one plane, which are held together by a common adhesive layer. Cable element cores with such ribbon cables can be manufactured much more inexpensively than, for example, those with loose tube cable element cores, and, in addition, are suitable for mass splicing. The twisting of the ribbon cables results in the desired excess length for the optical fibers compared with the cable element core and therefore as compared with the welded and drawn tube.

The optical fibers or the ribbon cables are expediently embedded in soft foam. This material protects the optical fibers during manufacture and ensures that the optical fibers can move within the tube. Suitable foams are polyurethane foam, polyethylene foam and the like.

The foam layer is produced with particular advantage by extrusion on the optical fibers. A polyethylene foam is suitable for this application.

DETAIL DESCRIPTION OF THE INVENTION

Figure 1:
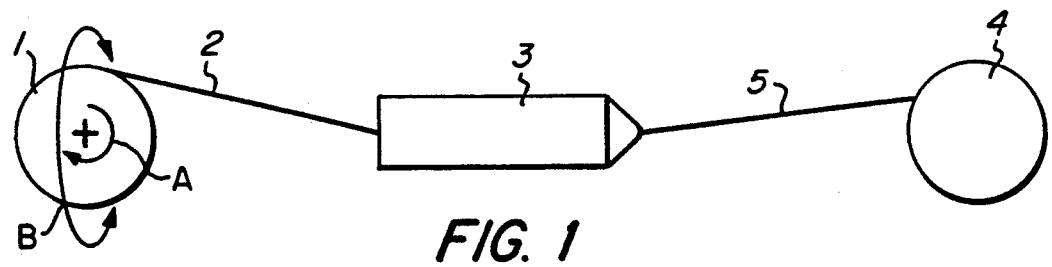
FIG. 1 is a schematic illustration of the method step of extruding a foam material on optical fibers.
Figure 2:
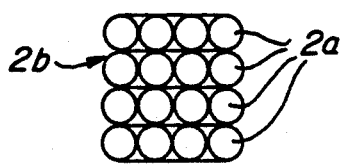
FIG. 2 is a cross-sectional view of a ribbon stack.

As illustrated in FIG. 1, optical fibers 2 are continuously drawn off a supply reel 1 which rotates in the direction of arrow A, provided with a foam layer in a foam extrusion apparatus 3 and wound onto a reel 4. As seen in FIG. 2, the optical fibers 2 are preferably one or more ribbon cables 2a or a ribbon stack 2b comprising a plurality of ribbon cables 2a. The supply reel 1 is rotated about an axis perpendicular to the reel axis and parallel to the longitudinal axis of the foam extrusion apparatus 3 during manufacture so that the ribbon cables 2a or, respectively, the ribbon stack 2b runs twisted about its longitudinal axis into the foam extrusion apparatus 3. The direction of rotation of the ribbon or ribbons 2a can alternate about an axis perpendicular to the reel axis and parallel to the longitudinal axis of the foam extrusion apparatus 3 as indicated by the arrow B in FIG. 1 so that the ribbon cable or cables 2a or the ribbon stack 2b, seen over their or its length, is alternately twisted clockwise for a certain distance and subsequently counter-clockwise. In this case, an SZ stranding is obtained in which the supply drum 1 operates in a stationary manner. The SZ stranding is created by an alternately driven guide, not shown, arranged before the foam extrusion apparatus 3. The cable element core 5 coming out of the foam extrusion apparatus 3 comprises the individual ribbons 2a or the ribbon stack 2b and of the foam layer 6 which is almost circular in cross-section.

Figure 3:
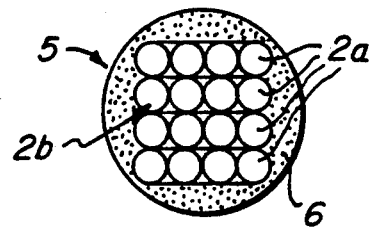
FIG. 3 is a cross-sectional view of a cable element core incorporating the ribbon stack.

The cable element core 5 shown in section in FIG. 3 is thus an element in which the optical fibers 2 are embedded with excess length in a soft-elastic foam layer 6 due to the torsion of the ribbon stack 2b or of the ribbon cables 2a. With the optical fibers 2 being wound off the supply reel and supplied to the foam extrusion apparatus 3 in ribbon form, there is no risk of the sensitive glass fibers breaking. A further protective layer is built up by embedding them in the soft foam layer 6.

Figure 4:
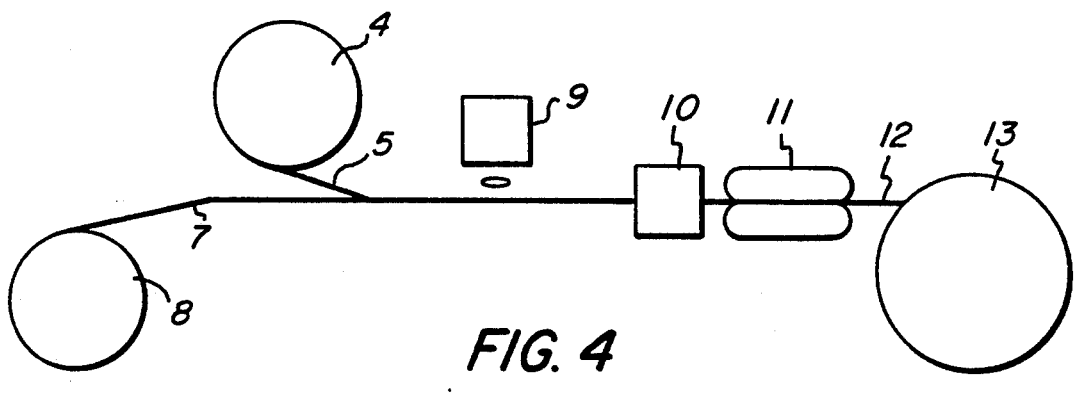
FIG. 4 is a schematic illustration of the method steps of the present invention following the extruding step of FIG. 1.

In a next process step illustrated in FIG. 4, the cable element core 5 is continuously sheathed by a metal band 7. The metal band 7 is wound off a supply reel 8 and is made of stainless steel for corrosion resistance. The metal band 7 is shaped to form a slotted tube, in a manner generally known by those skilled in the art and not described herein in greater detail, into which the cable element core 5 extends. The band edges of the slotted tube are brought into contact with one another and the slot is welded together with a laser welding device 9. During the shaping of the slotted tube, it must be ensured that the inside diameter of the slotted tube is greater than the outside diameter of the cable element core 5 so that the cable element core 5 is not damaged by the welding heat. The welded tube is then drawn down onto the outside diameter of the cable element core 5 by means of a drawing device 10, such as a drawing die. The drawing force required for this is supplied by a collet chuck draw-off 11. The optical fiber cable 12, which is now finished, can be wound onto a cable drum 13.

Figure 5:
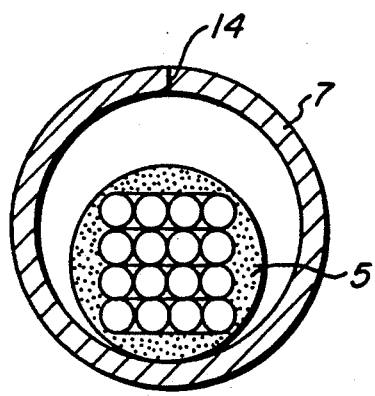
FIG. 5 is a cross-sectional view of the partially completed cable element shortly before or during the welding step

In FIG. 5, the condition shortly before or during the welding is shown in section. The metal band 7 is shaped into a tube with slot 14, the inside diameter of which is considerably larger than the outside diameter of the cable element core 5.

Figure 6:
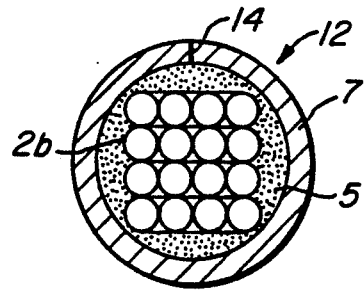
FIG. 6 is a cross-sectional view of the completed cable.

FIG. 6 shows the completed cable element 12. The tube shaped from the metal band 7 and welded together along the slot 14 is drawn onto the cable element core 5. The cable element 12 is thus longitudinally watertight. When the cable element is bent, the soft foam 6 allows the torsion of the ribbon stack 2b to be partially reduced. In addition, the ribbon stack 2b can move inside the tube as a result of which a certain excess length is additionally provided.

Figure 7:
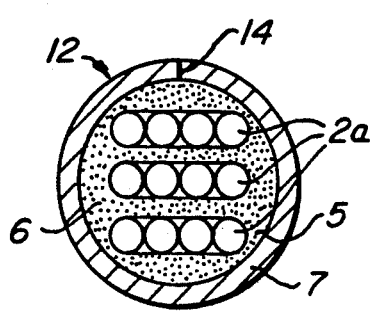
FIG. 7 is a cross-sectional view of a second embodiment of the completed cable element.

FIG. 7 shows a further illustrative embodiment of a cable element 12 which has been manufactured in accordance with the teaching of the invention. The ribbon cables 2a were supplied from separate supply reels which rotate about a common axis to the foam extrusion apparatus 3 and held at a distance from one another before running into the foam extrusion apparatus 3 by an also circulating guide, not shown in greater detail, so that the individual ribbon cables 2a are surrounded on all sides by the foam layer 6. In this cable element 12, the buffering of the optical fibers 2 is even better, but it must be acceptable that one less ribbon cable 2a can be accommodated in the cable element 12.

Using the method according to the invention, it was possible to manufacture a cable element 12 in one piece without faults and having the following dimensions:

Number of ribbon cables: 4
Number of optical fibers per ribbon cable: 4
Diameter of the run: 1.90 mm
Wall thickness of the steel band: 0.2 mm
Outside diameter of the cable element: 2.3 mm.

This cable element 12 can be used to form a ready-to-use underwater cable with reinforcing wires and insulating material in accordance with the requirements for the entire cable.

Thus, it can be seen from the foregoing specification and attached drawings that the method of the present invention provides a unique integration of steps to produce an optical fiber cable element.

The preferred embodiment described above admirably achieves the objects of the invention. However, it will be appreciated that the departures can be made by those skilled in the art without departing from the spirit and scope of the invention which is limited only by the following claims.

What is claimed is:

1. Method for manufacturing an optical fiber cable element comprising the steps of:
   a) providing a plurality of optical fibers;
   b) enclosing the optical fibers in a soft compressible compound to form a cable element core, the optical fibers being present with excess length in the cable element core;
   c) continuously forming a metal band into a slotted tube surrounding the cable element core, a distance remaining between the cable element core and the tube;
   d) welding the slotted tube together; and
   e) drawing the tube down on to the cable element core, whereby the optical fibers are protected and sealed inside the metal tube.

2. Method according to claim 1, wherein the optical fibers comprise at least one ribbon optical cable.

3. Method according to claim 2, further comprising the step of twisting the at least one ribbon cable in a direction about a longitudinal axis thereof prior to the enclosing step.

4. Method according to claim 2, further comprising the step of twisting the at least one ribbon cable in alternating directions about a longitudinal axis thereof prior to the enclosing step.

5. Method according to claim 1, wherein the soft compressible compound is a soft foam.

6. Method according to claim 5, wherein the enclosing step comprises extruding a layer of soft foam on the optical fibers.

7. Method according to claim 1, wherein the enclosing step comprises extruding a layer of the soft compressible compound on the optical fibers.

8. Method according to claim 7, wherein the soft compressible compound is a soft foam.

9. Method according to claim 1, wherein, after the enclosing step, the, cable element core has an outside diameter substantially equal to an inner diameter of the tube after the drawing step.

* * * * *

UNITED STATES PATENT AND TRADEMARK OFFICE
CERTIFICATE OF CORRECTION

PATENT NO. : 5,263,239

DATED : November 23, 1993

INVENTOR(S) : Gerhard Ziemek

It is certified that error appears in the above-identified patent and that said Letters Patent is hereby corrected as shown below:

On the title page, item [54] and in column 1, line 3, in the title, "WAVEGUIDE" should be --FIBER--;

Col. 6, line 12, "the," should be --the--.

Signed and Sealed this

Seventeenth Day of May, 1994

Attest:

BRUCE LEHMAN

Attesting Officer    Commissioner of Patents and Trademarks